United States Patent
Ramaiah et al.

(10) Patent No.: US 11,651,110 B2
(45) Date of Patent: May 16, 2023

(54) HARDWARE DEVICE MUTUAL AUTHENTICATION SYSTEM AND METHOD FOR A BASEBOARD MANAGEMENT CONTROLLER (BMC)

(71) Applicant: Dell Products, L.P., Round Rock, TX (US)

(72) Inventors: Dharma Bhushan Ramaiah, Bengaluru (IN); Viswanath Ponnuru, Bangalore (IN); Chandrasekhar Mugunda, Austin, TX (US); Rama Rao Bisa, Bangalore (IN); Shinose Abdul Rahiman, Bangalore (IN); Vineeth Radhakrishnan, Bangalore (IN); Chandrashekar Nelogal, Round Rock, TX (US); Chitrak Gupta, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/381,508

(22) Filed: Jul. 21, 2021

(65) Prior Publication Data
US 2023/0009968 A1     Jan. 12, 2023

(30) Foreign Application Priority Data
Jul. 8, 2021    (IN) .............................. 202111030709

(51) Int. Cl.
*G06F 21/73*     (2013.01)
*G06F 21/85*     (2013.01)
(Continued)

(52) U.S. Cl.
CPC ............ *G06F 21/73* (2013.01); *G06F 21/602* (2013.01); *G06F 21/64* (2013.01); *G06F 21/85* (2013.01)

(58) Field of Classification Search
CPC ........ G06F 21/73; G06F 21/602; G06F 21/64; G06F 21/85
See application file for complete search history.

(56) References Cited

U.S. PATENT DOCUMENTS 11,025,701 B1 *   6/2021   Bansal .................... H04L 67/02
2016/0344731 A1 *   11/2016   Serebrin ............... H04L 63/164
(Continued)

OTHER PUBLICATIONS

Dasari, Satvik, and Vishal Madipadga. "Aegis: A framework to detect compromised components in the supply chain of information technology infrastructure." Oct. 17-18, 2020, In 2020 International Workshop on Big Data and Information Security (IWBIS), pp. 159-164. IEEE (Year: 2020).*

*Primary Examiner* — Shin-Hon (Eric) Chen
*Assistant Examiner* — Ethan V Vo
(74) *Attorney, Agent, or Firm* — Fogarty LLP

(57) ABSTRACT

An Information Handling System (IHS) includes multiple hardware devices, and a baseboard Management Controller (BMC) in communication with multiple hardware devices of the IHS. The BMC includes executable instructions for transmitting a broadcast message to the hardware devices in which the broadcast message has a block of data including a digital signature of the BMC. Each of the hardware devices that receive the broadcast message are configured to transmit a broadcast acknowledgment message to the BMC. Using the block of data, the BMC and hardware devices may perform a mutual consensus procedure with other using a cryptographic hash function of the block of data.

19 Claims, 5 Drawing Sheets

(51) Int. Cl.
*G06F 21/60* (2013.01)
*G06F 21/64* (2013.01)

(56) References Cited

U.S. PATENT DOCUMENTS

| | | | |
|---|---|---|---|
| 2018/0341930 A1* | 11/2018 | Moir | H04L 9/3247 |
| 2019/0052617 A1* | 2/2019 | Chen | H04L 63/0823 |
| 2019/0164156 A1* | 5/2019 | Lindemann | H04L 9/3271 |
| 2019/0173666 A1* | 6/2019 | Ardashev | H04L 9/0637 |
| 2019/0235946 A1* | 8/2019 | Guo | G06F 21/602 |
| 2019/0236271 A1* | 8/2019 | Shivanna | G06F 21/575 |
| 2019/0340375 A1* | 11/2019 | Lambert | H04L 63/0823 |
| 2020/0389519 A1* | 12/2020 | Bartolucci | H04L 67/104 |
| 2021/0152381 A1* | 5/2021 | Hunt | H04L 12/185 |
| 2021/0312044 A1* | 10/2021 | Berger | G06F 21/572 |
| 2021/0314365 A1* | 10/2021 | Smith | G06F 11/3006 |

\* cited by examiner

500

| OFFSET | FIELD | SIZE IN BYTES | VALUE |
|---|---|---|---|
| 0 | SPDM VERSION | 1 | V1.0 = 0 X 12 — 502 |
| 1 | RequestResponseCode | 1 | 0 X 88 = SPDM_BROADCAST_BLOCK — 504 |
| 2 | PARAMETER 1 | 1 | RESERVED — 506 |
| 3 | PARAMETER 2 | 1 | RESERVED — 508 |
| 4 | LENGTH OF BLOCK DATA | 2 | LENGTH OF BLOCK OF DATA — 510 |
| 5 | BLOCK OF DATA | N | BDF, PUBLIC KEY, SIGNATURE, PREVIOUS HASH — 512 |

| OFFSET | FIELD | SIZE IN BYTES | VALUE |
|---|---|---|---|
| 0 | SPDM VERSION | 1 | V1.0 = 0 X 12 — 522 |
| 1 | RequestResponseCode | 1 | 0 X 08 = SPDM_BLOCK_ACK — 524 |
| 2 | PARAMETER 1 | 1 | RESERVED — 526 |
| 3 | PARAMETER 2 | 1 | RESERVED — 528 |

FIG. 5B

HARDWARE DEVICE MUTUAL AUTHENTICATION SYSTEM AND METHOD FOR A BASEBOARD MANAGEMENT CONTROLLER (BMC)

CROSS REFERENCE TO RELATED APPLICATIONS

This patent application claims priority to co-pending, commonly assigned Indian Patent Application No. 202111030709, filed Jul. 8, 2021 and entitled "Hardware Device Mutual Authentication System and Method for a Baseboard Management Controller (BMC);" the entire contents of which are incorporated by reference herein.

FIELD

This disclosure relates generally to Information Handling Systems (IHSs), and more specifically, to a hardware device mutual authentication system and method for a baseboard management controller (BMC).

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware, and software components that may be configured to process, store, and communicate information and may include one or more computer systems, data storage systems, and networking systems.

In modern day IHSs, administrative management is often provided via baseboard management controllers (BMCs). The baseboard management controller (BMC) generally includes a specialized microcontroller embedded on the motherboard of the IHS, and provides an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take some corrective actions, such as resetting or power cycling the system to get a hung O/S running again. These abilities save on the total cost of ownership of an IHS, particularly when implemented in large clusters, such as server farms.

SUMMARY

An Information Handling System (IHS) includes multiple hardware devices, and a Baseboard Management Controller (BMC) in communication with multiple hardware devices of the IHS. The BMC includes executable instructions for transmitting a broadcast message to the hardware devices in which the broadcast message has a block of data including a digital signature of the BMC. Each of the hardware devices that receive the broadcast message are configured to transmit a broadcast acknowledgment message to the BMC. Using the block of data, the BMC and hardware devices may perform a mutual consensus procedure with each other using a cryptographic hash function of the block of data.

According to another embodiment, a mutual consensus method includes the steps of transmitting a broadcast message to multiple hardware devices of an information handling system (IHS) from a baseboard management controller (BMC). The broadcast message comprises a block of data including a digital signature of the BMC. Each of the hardware devices that receive the broadcast message transmit a broadcast acknowledgment message to the BMC. Using the block of data, each of the BMC and hardware devices that responded to the broadcast message may mutually authenticate each other using a cryptographic hash function of the block of data.

According to yet another embodiment, a Baseboard Management Controller (BMC) include executable code for transmitting a broadcast message to a plurality of hardware devices of an information handling system (IHS) in which the broadcast message has a block of data including a digital signature of the BMC. Each of the hardware devices that receive the broadcast message are configured to transmit a broadcast acknowledgment message to the BMC, and perform a mutual consensus procedure with each of those hardware devices that responded to the broadcast message using a cryptographic hash function of the block of data.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIGS. 5A and 5B illustrate an example SPDM broadcast message and SPDM acknowledgment message, respectively, that may be implemented with the mutual authentication system according to one embodiment of the present disclosure.

DETAILED DESCRIPTION

Figure 1:
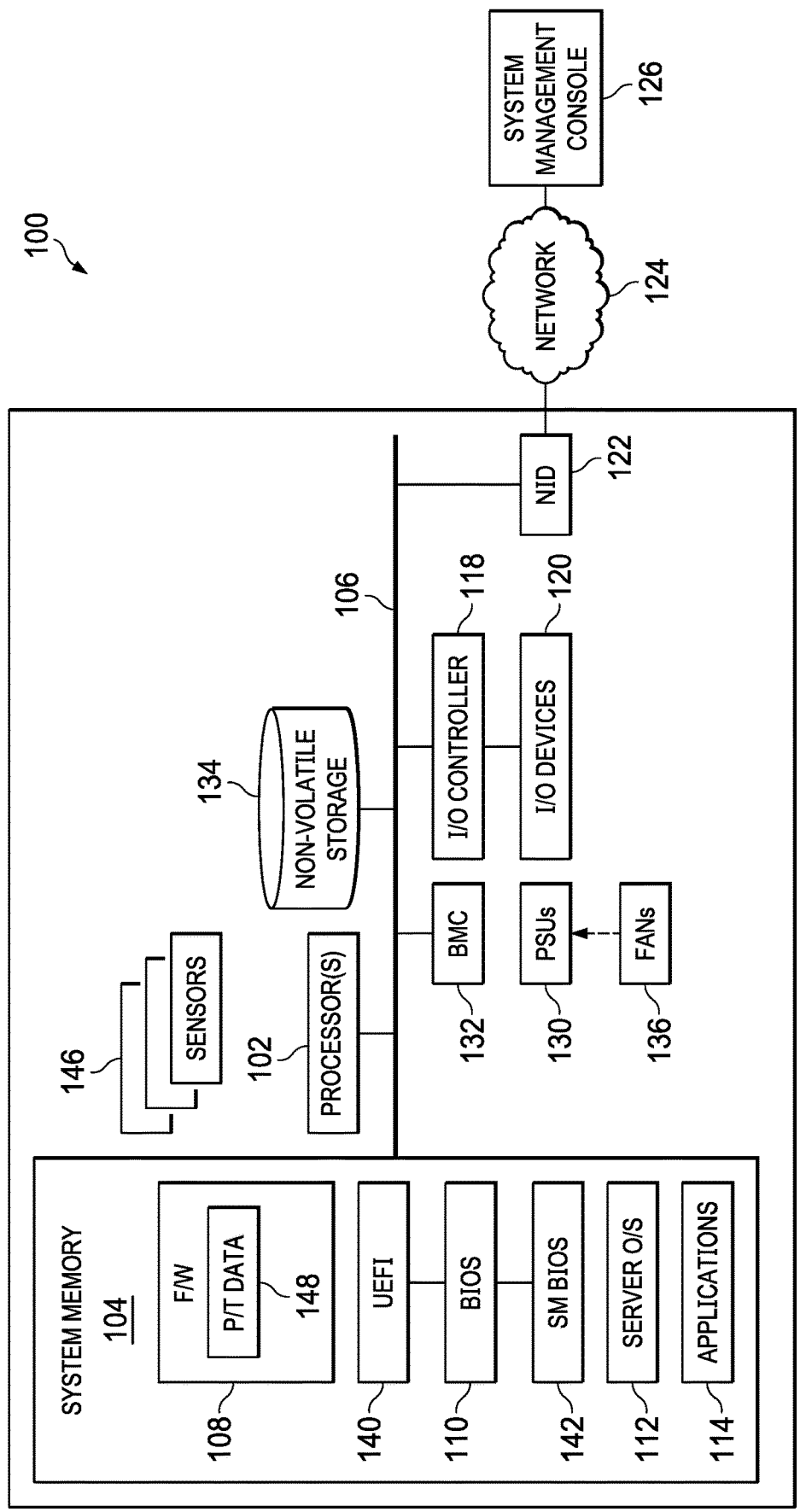
FIG. 1 is a block diagram of examples of components of an Information Handling System (IHS) that may be used to implement a mutual authentication system and method according to one embodiment of the present disclosure.

Embodiments of the present disclosure provide a system and method for mutual authentication of baseboard management controllers (BMCs) and one or more hardware devices present in an information handling system (IHS).

While newer communication protocols, such as the security protocol and data model (SPDM) protocol, have been implemented on BMC architectures due to, among other things, their relatively high level of flexibility, security, and extensibility, these benefits have incurred certain drawbacks. For example, the Peripheral Component Interconnect Express (PCIe) vendor defined message (VDM) channels used by SPDM provide for peer-to-peer messaging which could allow illicit algorithms on hardware devices to communicate outside of the purview of the BMC, thus yielding a security weakness where the BMC's management functions could be spoofed. Embodiments of the present disclosure provide a solution to this problem, among others, where the hardware devices are mutually authenticated with the BMC in a manner that reduces or eliminates peer-to-peer messaging among the hardware devices of an IHS outside of the management functions provided by the BMC.

The security protocol and data model (SPDM) specification defines messages and procedures for communication among hardware devices, which includes authentication of hardware devices and session key exchange protocols to provide secure communication among those hardware devices. Management Component Transport Protocol (MCTP) Peripheral Component Interconnect Express (PCIe) vendor defined message (VDM) channels, which supports peer-to-peer messaging (e.g., route by ID), allow a SPDM-enabled hardware device to send commands to other SPDM-enabled hardware devices without the intervention of a BMC, thus circumventing the ability of the BMC to perform its tasks of managing the operations of the hardware devices in an IHS. For example, a SPDM-enabled hardware device, even if authenticated, can change the configuration of other hardware devices (e.g., Dell PowerEdge RAID Controllers (PERC) Device IDs, network interface card (NIC) network partitions, etc.).

Baseboard management controllers (BMCs) are particularly well suited for the features provided by the SPDM specification. A BMC generally includes a specialized microcontroller embedded in the IHS, and may provide an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of certain hardware devices in the IHS. The administrator can also remotely communicate with the BMC to take certain corrective actions, such as resetting or power cycling the system to get a hung O/S running again. These abilities can often save on the total cost of ownership of an IHS, particularly when implemented in large clusters, such as server farms.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

The SPDM specification specifies a technique to mutually authenticate connected hardware devices in an IHS. SPDM Mutual authentication can be achieved by verifying the hardware device's certificate by the BMC, and verifying the BMC's certificate by the hardware device. Once authenticated, the hardware devices in an IHS can send SPDM encapsulated messages to each other. This introduces a problem, however, in which two devices can start communicating with each other, without oversight by the BMC. As a result, one device can change the configuration of the other device without the knowledge of the BMC.

In its present current form, the SPDM specification does not solve the man-in-the-middle attack problem. A malicious device can spoof another hardware device into thinking it is a BMC, obtain certificates from the hardware device, and present the same certificate to BMC to get itself authenticated by the BMC. Additional problems with the conventional state of the SPDM specification involves the use of tiered architectures, such as storage controllers that should perform its own mutual authentication with its respective storage devices. Current implementations of the SPDM specification do not provide any meaningful techniques for dealing with such tiered architectures. As will be described in detail herein below, embodiments of the present disclosure provide a mutual authentication system and method for BMCs implemented with SPDM-enabled hardware devices in an IHS that provide a solution to the problems, among other problems, described herein above. Although the present disclosure is directed to systems and methods for mutual authentication of BMCs implemented with SPDM-enabled hardware devices in an IHS, it is contemplated that embodiments of the present disclosure may be adapted for use with any network of hardware devices that communicate with each other according to the SPDM specification.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

FIG. 1 is a block diagram of examples of components of an Information Handling System (IHS) that may be used to implement a mutual authentication system and method according to one embodiment of the present disclosure. Particularly, IHS 100 includes one or more processor(s) 102 coupled to system memory 104 via system interconnect 106. System interconnect 106 may include any suitable system bus. System memory 104 may include a plurality of software and/or firmware modules including firmware (F/W) 108, basic input/output system (BIOS) 110, operating system (O/S) 112, and/or application(s) 114. Software and/or firmware module(s) stored within system memory 104 may be loaded into processor(s) 102 and executed during operation of IHS 100.

F/W 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of an IHS 100. This feature can eliminate the need for the operating system to probe hardware directly to discover what devices are present in the computer.

IHS 100 includes one or more input/output (I/O) controllers 118 which manages the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), which may be included or coupled to IHS 100.

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

IHS 100 further includes one or more power supply units (PSUs) 130. PSUs 130 are coupled to a BMC 132 via an I²C bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, PSUs 130, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. Management operations may be performed by BMC 132 even if IHS 100 is powered off, or powered down to a standby state. BMC 132 may include a processor, memory, and an out-of-band network interface separate from and physically isolated from an in-band network interface of IHS 100, and/or other embedded resources.

In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC).

Figure 2:
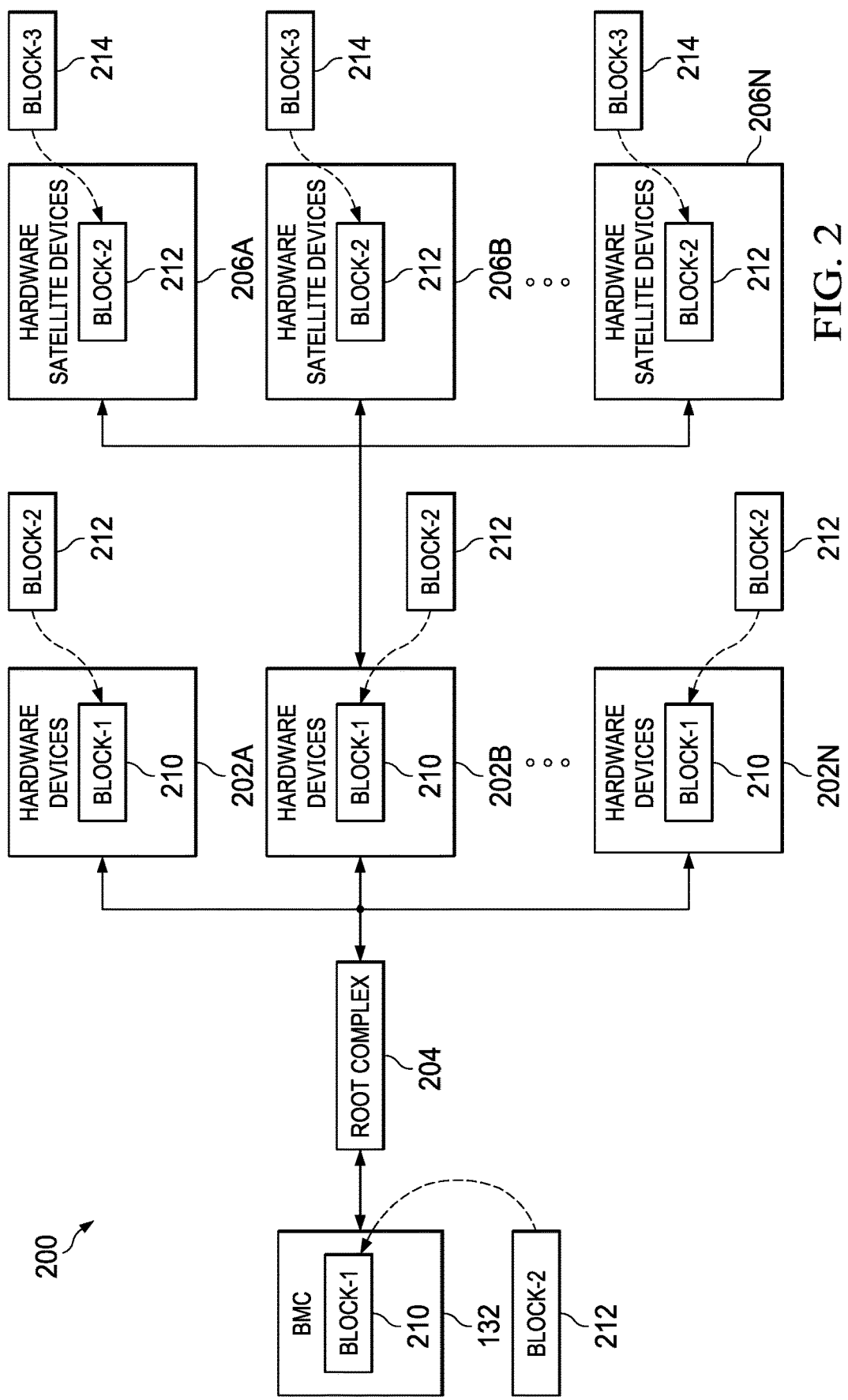
FIG. 2 illustrates an example hardware device mutual authentication system according to one embodiment of the present disclosure.

FIG. 2 illustrates an example hardware device mutual authentication system 200 according to one embodiment of the present disclosure. The system 200 includes a BMC 132 that is in communication with and manages multiple hardware devices 202 A-N via a root complex 204. One of the hardware devices 202, namely hardware device 202B, includes a tiered topology in which itself is in communication with and manages one or more satellite hardware devices 206 A-N. One example of a such a hardware device 202B would include a storage controller (e.g., hardware device 202B) that manages the operation of multiple storage devices (e.g., satellite hardware devices 206 A-N).

The BMC 132 initially stores a block-1 210 that is published to each hardware device 202 A-N. Block-1 generally includes a block of data that may be later used by a cryptographic hash function (CHF) for mutual authentication by the BMC 132 with the hardware devices 202 A-N. In one embodiment, the block-1 210 is published to the hardware devices 202 as part of a broadcast message. Because the BMC 132 is considered to be the hub of all SPDM-enabled hardware devices in the IHS 100, it is the only device that is allowed to send the broadcast command. Thus, consensus is established with the hardware devices 202 that function at least somewhat like a peer-to-peer network. Within a distributed computing context, consensus is a condition in which most or all participating nodes in a network achieve an agreed upon data value from which further computation may be accomplished in a coordinated manner. In the present case, the BMC 132 is the only device that is allowed to issue the broadcast message and because the hardware devices 202 are configured to only accept and ledger block-1 210 when it is encapsulated in the broadcast message, consensus is achieved.

During mutual authentication, block-1 210 is replaced by block-2 212. That is, when the CHF is applied to block-1 210 in each of the BMC 132 and hardware devices 202 to perform mutual authentication, it generates block-2 212 that replaces block-1 210. Each of the BMC 132 and hardware devices 202 are only allowed to ledger one block and therefore, authentication for each of the hardware devices 202 is only made possible via the BMC 132. In the event that a foreign device attempts to perform authentication with either of the hardware devices 202, that hardware device 202 may generate an asynchronous event notification (AEN) that is transmitted to the BMC 132. The BMC 132 in turn, may store information associated with the event in a logfile and/or transmit information associated with the event to an administrator computing device, such as a computing device managed by a vendor of the IHS 100 who warranties the operation of the IHS 100.

In one embodiment, a hardware device 202B may perform mutual authentication with one or more satellite hardware devices 206 A-N. As a result of hardware device 202B performing a successful authentication with the BMC 132, it may then perform its own mutual authentication with its respective satellite hardware devices 206 A-N. To accomplish this, the hardware device 202B publishes block-2 212, which was generated during its mutual authentication procedure with the BMC 132, to each of the satellite hardware devices 206 A-N. During the satellite mutual authentication procedure, each satellite hardware device 206 A-N generates block-3 214 from block-2 212 using a CHF. Additional details of how the satellite hardware devices 206 A-N may be mutually authenticated will be described in detail herein below.

Thus by extending the SPDM consensus blocks, the BMC 132 can provide authority for a hardware device 202 A-N to authenticate other hardware devices 202 A-N. The mutual authentication system scales for other hardware devices 202 A-N arranged in a hierarchical or tiered configuration, such as those hardware devices 202 A-N coupled to PCIe switches or storage controllers. Additionally, it should be appreciated that, although only one tiered arrangement of satellite hardware devices 206 A-N is shown and described, the SPDM consensus blocks may be used to provide mutual authentication with any number of tiered arrangements of satellite hardware devices 206 A-N.

Figure 3:
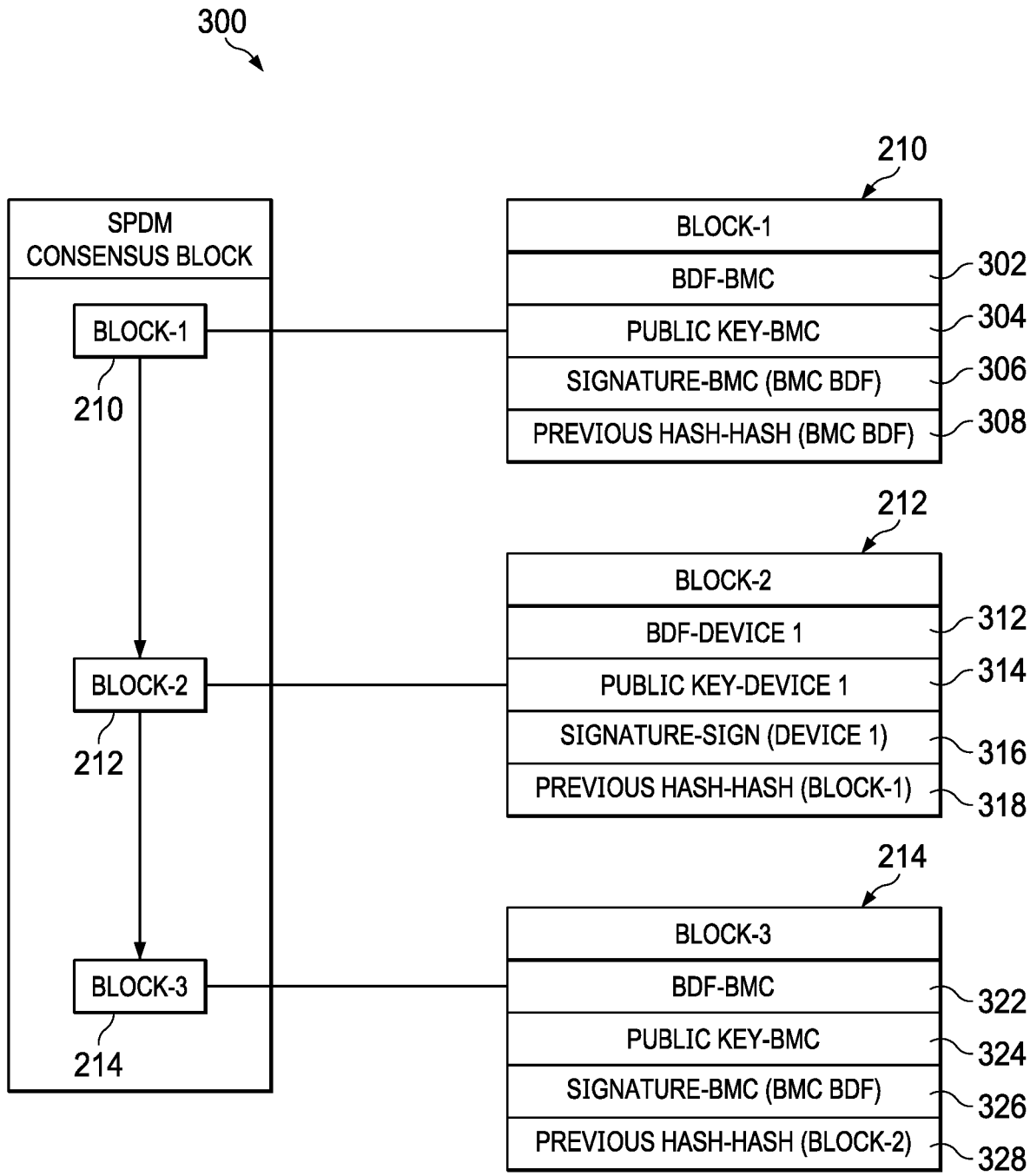
FIG. 3 illustrates a detailed view of several example consensus blocks forming a block chain that may be used to perform mutual authentication according to one embodiment of the present disclosure.

FIG. 3 illustrates a detailed view of several example consensus blocks forming a block chain 300 that may be used to perform mutual authentication according to one embodiment of the present disclosure. In particular, block-1 210 is initially generated by the BMC 132, and block-2 212 is generated by each hardware device 202 A-N and BMC 132 using a CHF of block-1 210. block-3 214 is generated by a hub hardware device 202 along with each satellite hardware device 206 A-N using a CHF of block-2 212.

As shown, block-1 210 includes a bus/device/function (BDF) 302, a BMC public key 304, a digital signature 306, and a previous hash value 308. Because block-1 210 is the first block generated, its previous hash value 308 is generated from the BDF of the BMC 132. The BDF is a logical construct of a PCI or PCIe bus specification that allocates an eight bit field that can be used to uniquely identify and address each device that interconnects to the PCI or PCIe bus. Using the BDF may be particularly useful in that it provides relatively tight coupling to the physical hardware of the BMC 132. That is, the BDF of the BMC 132 provides a relatively permanent value that can tie the generated consensus blocks back to the physical structure of the BMC 132 from which they are generated.

Block-2 212 also includes a BDF 312, a public key 314, a digital signature 316, and a previous hash value 318. Block-2 212 is derived from block-1 210 because it is generated using a previous hash value 318 of block-1 210. Likewise, block-3 214 includes a BDF 322, a public key 324, a digital signature 326, and a previous hash value 328 that is generated using a previous hash value 318 of block-2 212. Block-3 214 would be particularly useful for providing mutual authentication for satellite hardware devices 206 that may not be in direct communication with the BMC 132.

Thus as can be clearly seen, the blocks form a block chain arrangement in which each successive block is based on a previously generated block in the chain. Such an arrangement provides a relatively strong binding back to the physical structure of the BMC 132 and hardware devices 202 while providing a consensus mechanism that can be used for mutual authentication.

Although FIG. 3 describes one example of a block chain 300 that may be used to provide mutual authentication, the features of the disclosed block chain 300 may be embodied in other specific forms without deviating from the spirit and scope of the present disclosure. For example, while the individual blocks forming the block chain 300 are shown and described as having a BDF, a public key, a digital signature, and a previous hash value, other embodiments may provide blocks having additional, fewer, or different fields than those explicitly described herein. As another example, while block-1 210 is shown including a BDF 302 of the BMC 132, it should be appreciated that block-1 210 may use any other value associated with the BMC 132, such as a unique identifier (e.g., serial number) of the BMC 132, in lieu of the BDF 302.

Figure 4:
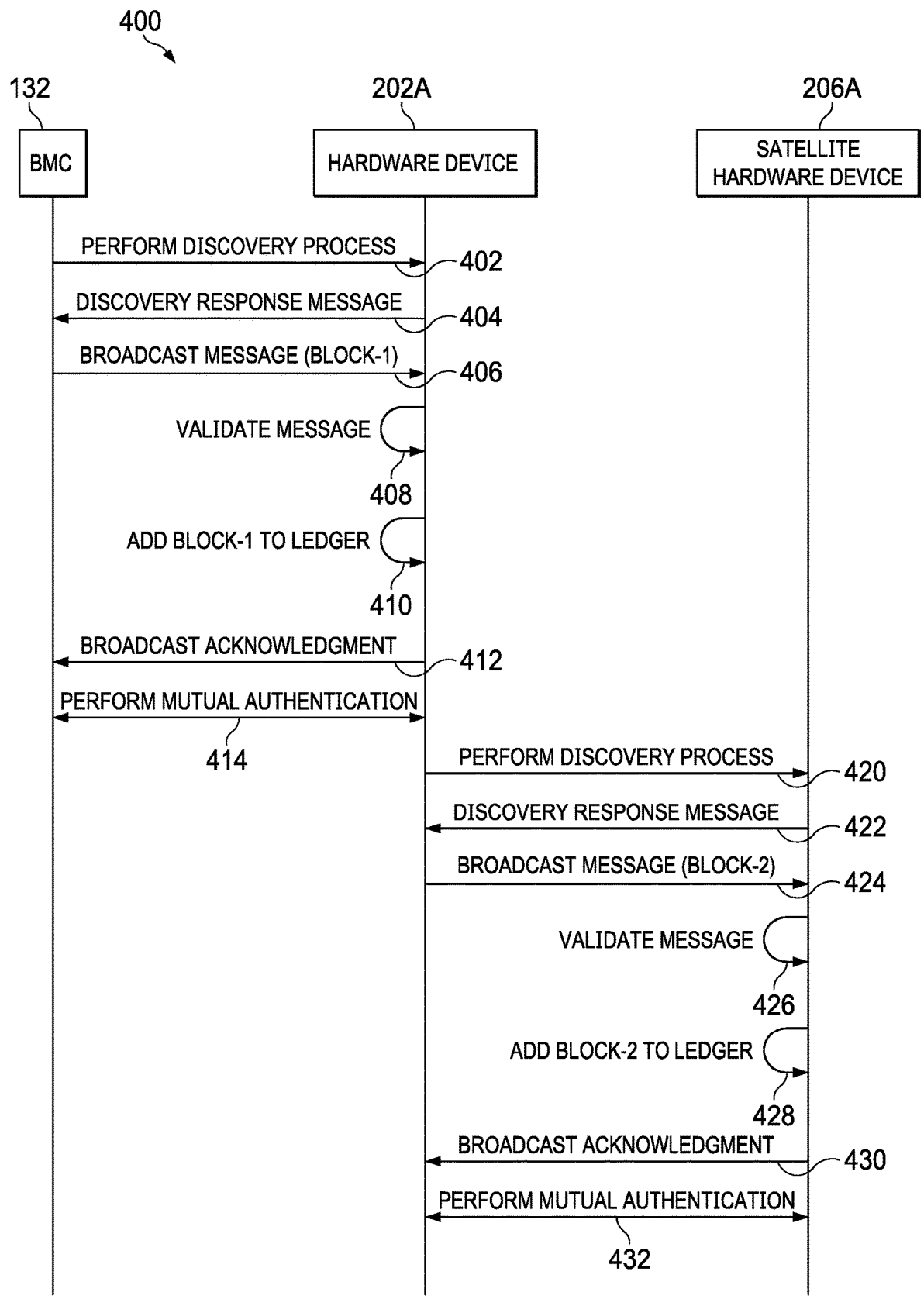
FIG. 4 illustrates an example flow diagram of hardware device mutual authentication method according to one embodiment of the present disclosure.

FIG. 4 illustrates an example flow diagram of hardware device mutual authentication method 400 according to one embodiment of the present disclosure. Additionally or alternatively, the method 400 may be performed in whole or in part by the hardware device mutual authentication system 200 as described above with reference to FIG. 2. As will be described in detail herein below, the method 400 may be provided for mutual authentication of hardware devices 202 and 206 prior to allowing them to access the processes (e.g., I/O operations) of the host IHS 100 or BMC 132.

Initially, the IHS 100 is configured with a BMC 132 and a hardware device 202A and satellite hardware device 206A that are capable of communicating using the SPDM protocol. Additionally, the hardware device 202A is in direct communication with the BMC 132, while satellite hardware device 206A is configured to communicate with the BMC 132 through the hardware device 202A. Although only two hardware devices 202A, 206A are shown and described in the method 400, it should be understood that the method 400 can be practiced with any quantity of hardware devices 202A in direct communication with the BMC 132, and/or any quantity of hardware devices 206A that communicate with the BMC 132 through a hardware device 202A. The method 400 may be performed any time that mutual authentication of certain hardware devices 202A and/or hardware devices 206A in an IHS 100 are needed or desired. In a particular example, the method 400 may be performed when the IHS 100 and BMC 132 are booted following the application of power.

At step 402, the BMC 132 performs a discovery process to identify the hardware devices 202A in the IHS 100. In one embodiment, the BMC 132 performs a PCIe VDM discovery process. Thereafter at step 404, the hardware device 202A transmits a discovery response message to the BMC 132 indicating its existence in the IHS 100. The BMC 132 uses the discovery response message information to determine which hardware devices 202 exist in the IHS 100, and thus, which hardware devices 202 are to receive block-1 210. At step 406, the BMC 132 transmits a broadcast message to the hardware device 202A in which the broadcast message includes block-1 210. In one embodiment, the broadcast message may be a 'SPDM BROADCAST BLOCK' message that is routed through the root complex 204.

At step 408, the hardware device 202A validates whether or not the received message is a broadcast message. If it is, the received block-1 210 shall be added to its ledger at step 410. If the hardware device 202A, however, determines that the received message is not a broadcast message, nothing shall be added to the ledger. In this manner, because the BMC 132 is the only device that is allowed to issue broadcast commands, security may be enhanced be ensuring that only the BMC 132 is allowed to issue blocks to the hardware device 202A. The hardware device 202A then transmits a broadcast acknowledgment message to the BMC 132 indicating that the broadcast message was accepted, and that block-1 210 was added to the ledger of the hardware device 202A at step 412. In other words, transmission of the broadcast acknowledgment message indicates that the hardware device 202A has achieved consensus with the BMC 132.

At step 414, the BMC 132 and hardware device 202A perform mutual authentication with one another. In one embodiment, the mutual authentication may involve generation of block-2 212, which replaces block-1 210 in the ledger of the BMC 132 and hardware device 202A. In another embodiment, mutual authentication may be performed by the BMC 132 initially authenticating the hardware device 202A followed by the hardware device 202A authenticating the BMC 132.

While steps 402-414 describe a successfully mutual authentication procedure, scenarios may exist where mutual authentication may not be successful. For example, if the hardware device 202A receives a request that violates above mentioned protocol, then the hardware device 202A shall send an event notification (e.g., asynchronous event notification (AEN) to the BMC 132 so that it can store the event notification in a logfile and, in some cases, transmit the event notification to an administrative computer, such as an entity that manages the operation of the IHS 100. At this point, the BMC 132 and hardware device 202A are mutually authenticated with one another, and thus can communicate in a relatively secure manner to perform their respective processes.

Steps 420-432 describe a procedure that may be performed to perform mutual authentication for a satellite hardware device 206A configured in the IHS 100. For example, the satellite hardware device 206A may be a storage device (e.g., hard disk drive) that communicates with the BMC 132 through a hardware device 202A configured as a storage controller.

At step 420, the hardware device 202A performs a discovery process to identify any satellite hardware devices 202A that it may be in communication with. Thereafter at step 422, the satellite hardware device 206A transmits a discovery response message to the hardware device 202A indicating its existence. The hardware device 202A uses the discovery response message information to determine which hardware devices 206 that it is in communication with, and thus, which hardware devices 206 are to receive block-2 212, which is currently stored in the ledger of the hardware device 202A. At step 424, the hardware device 202A transmits a broadcast message to the satellite hardware device 206A in which the broadcast message includes block-2 212. In one embodiment, the broadcast message may be a 'SPDM BROADCAST BLOCK' message that is routed through the root complex 204.

At step 426, the satellite hardware device 206A validates whether or not the received message is a broadcast message. If it is, the received block-2 212 shall be added to its ledger at step 428. If the satellite hardware device 206A, however, determines that the received message is not a broadcast message, nothing shall be added to the ledger. The satellite hardware device 206A then transmits a broadcast acknowledgment message to the hardware device 202A indicating that the broadcast message was accepted, and that block-2 212 was added to the ledger of the satellite hardware device 206A at step 430. In other words, transmission of the broadcast acknowledgment message indicates that the satellite hardware device 206A has achieved consensus with the hardware device 202A. In one embodiment, the hardware device 202A may include separate ledgers for mutual authentication with the BMC 132 and satellite hardware device 206A. That is, the hardware device 202A may maintain two ledgers; one for mutually authenticating with the BMC 132 and the other one for mutually authenticating with any satellite hardware devices 206 it may be in communication with.

At step 432, the hardware device 202A and satellite hardware device 206A perform mutual authentication with one another. In one embodiment, the mutual authentication may involve generation of block-3 214, which replaces block-2 212 in the ledger of the hardware device 202A and satellite hardware device 206A. In another embodiment, mutual authentication may be performed by the BMC 132 initially authenticating the hardware device 202A followed by the hardware device 202A authenticating the BMC 132.

Thus as can be seen, the mutual authentication method 400 described above scales for tiered systems, such as those including a storage controller or PCIe switch, which may include satellite hardware devices 206A-N that may not be in direct communication with the BMC 132. Nevertheless, when use of the workspace migration method 400 is no longer needed or desired, the process ends.

Although FIG. 4 describes an example method that may be performed for performing mutual authentication with hardware devices 202A and satellite hardware devices 206A in an IHS 100, the features of the method 400 may be embodied in other specific forms without deviating from the spirit and scope of the present disclosure. For example, the method 400 may perform additional, fewer, or different operations than those described in the present examples. As another example, certain steps of the method 400 may be performed by other components in the IHS 100 other than those described above.

FIGS. 5A and 5B illustrate an example SPDM broadcast message 500 and SPDM acknowledgment message 520, respectively, that may be implemented with the mutual authentication system according to one embodiment of the present disclosure. In one embodiment, the messages 500, 520 may be implemented to function with a MCTP PCIe, VDM channel. In another embodiment, the messages 500, 520 may be used to implement the mutual authentication system and method described herein above.

The broadcast message 500 includes several fields including a SPDM version field 502, a requestResponseCode field 504, two reserved fields 506, 508, a data block length field 510, and a data field 512 for storing the block of data. The SPDM version field 502 is 1 byte in size and may be included with values for indicating a version of the SPDM specification that the broadcast message 500 is designed to function with. The reqestResponseCode field 504 has a value of 0x88 to indicate to recipient hardware devices 202 A-N, 206 A-N that the broadcast message 500 is expected to be responded to. The data field 512 includes either the data associated with Block-1 210, Block-2 212, or Block-3 214, while the data block length field 510 indicates a size in bytes of the data field 512.

The broadcast acknowledgment message 520 includes several fields including a SPDM version field 522, a reqestResponseCode field 524, and two reserved fields 526, 528. The SPDM version field 522 indicates a version of the SPDM specification that the broadcast acknowledgment message 520 is designed to function with, which in this particular example broadcast acknowledgment message 520 is version 1.0 of the SPDM specification. The requestResponseCode field 504 has a value of 0x08 to indicate that the broadcast acknowledgment message 520 serves as an acknowledgment to the broadcast message 500 described herein above.

Although FIG. 5 illustrates an example broadcast message 500 and broadcast acknowledgment message 520 that may be implemented for use with SPDM-enabled hardware devices in an IHS 100, the features of the broadcast message 500 and broadcast acknowledgment message 520 may be embodied in other specific forms without deviating from the spirit and scope of the present disclosure. For example, the broadcast message 500 and broadcast acknowledgment message 520 may include additional, fewer, or different fields than those described in the present examples. As another example, the values shown in the fields of the broadcast message 500 and broadcast acknowledgment message 520 are only exemplary in that they are intended to show what may possibly be included in those fields, and not what is required to be in those fields.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a plurality of Security Protocol and Data Model (SPDM)-enabled hardware devices; and
   a Baseboard Management Controller (BMC) in communication with the plurality of SPDM-enabled hardware devices, the BMC comprising one or more processors and one or more memory units including instructions that, upon execution by the processors, are executed to:
   transmit a broadcast message to the plurality of SPDM-enabled hardware devices through a root complex of a PCIe bus using a SPDM-based protocol, wherein the broadcast message comprises a block of data including a digital signature of the BMC, and wherein each of the SPDM-enabled hardware devices that receive the broadcast message are configured to transmit a broadcast acknowledgment message to the BMC; and
   perform a first consensus procedure with each of those SPDM-enabled hardware devices that responded to the broadcast message using a cryptographic hash function of the block of data, wherein each of the SPDM-enabled hardware devices perform a second consensus procedure with the BMC using the cryptographic hash function of the block of data.

2. The IHS of claim 1, wherein the instructions are further executed to transmit an event notification to an administrator computer when one of the SPDM-enabled hardware devices receives a request to perform consensus procedure with another SPDM-enabled hardware device other than the BMC.

3. The IHS of claim 1, wherein the SPDM-enabled hardware devices are each inhibited from transmitting the broadcast message.

4. The IHS of claim 1, wherein the instructions are further executed to derive the digital signature of the BMC from a bus device function (BDF) of the BMC.

5. The IHS of claim 1, wherein the instructions are further executed to store the block of data in a ledger in the BMC.

6. The IHS of claim 1, wherein each of the SPDM-enabled hardware devices are only allowed to perform the second consensus procedure when the block of data has been validated by the SPDM-enabled hardware device.

7. The IHS of claim 1, wherein the instructions are further executed to:
   perform a discovery process to discover the SPDM-enabled hardware devices in the IHS; and
   transmit the broadcast message to only those SPDM-enabled hardware devices that were discovered during the discovery process.

8. The IHS of claim 1, wherein at least one of the SPDM-enabled hardware devices comprise one or more processors and one or more memory units including hardware device instructions that, upon execution by the processors, are executed to:
   transmit a second broadcast message to a plurality of second SPDM-enabled hardware devices, wherein the second broadcast message comprises a second block of data including a digital signature of the one hardware device, and wherein each of the second SPDM-enabled hardware devices that receive the second broadcast message are configured to transmit a broadcast acknowledgment message to the BMC; and
   perform a third consensus with each of those second SPDM-enabled hardware devices that responded to the second broadcast message using a second cryptographic hash function of the second block of data, wherein each of the second SPDM-enabled hardware devices perform a fourth consensus procedure with the BMC using the second cryptographic hash function of the block of data.

9. The IHS of claim 1, wherein the block of data further includes at least one of a public key of the BMC and a previous hash value generated from the cryptographic hash function of a previous block of data.

10. A mutual consensus method comprising:
transmitting, using instructions stored in at least one memory and executed by at least one processor, a broadcast message to a plurality of Security Protocol and Data Model (SPDM)-enabled hardware devices of an information handling system (IHS) from a baseboard management controller (BMC) through a root complex of a PCIe bus using a SPDM-based protocol, wherein the broadcast message comprises a block of data including a digital signature of the BMC, and wherein each of the SPDM-enabled hardware devices that receive the broadcast message are configured to transmit a broadcast acknowledgment message to the BMC; and
performing, using the instructions, a first consensus procedure with each of those SPDM-enabled hardware devices that responded to the broadcast message using a cryptographic hash function of the block of data, wherein each of the SPDM-enabled hardware devices perform a second consensus procedure with the BMC using the cryptographic hash function of the block of data.

11. The mutual consensus method of claim 10, further comprising:
inhibiting the SPDM-enabled hardware devices from transmitting the broadcast message.

12. The mutual consensus method of claim 10, further comprising deriving the digital signature of the BMC from a bus device function (BDF) of the BMC.

13. The mutual consensus method of claim 10, further comprising only allowing the SPDM-enabled hardware devices to perform the second consensus procedure when the block of data has been validated by the hardware device.

14. The mutual consensus method of claim 10, further comprising:
transmitting a second broadcast message to a plurality of second SPDM-enabled hardware devices, wherein the second broadcast message comprises a second block of data including a digital signature of the one hardware device, and wherein each of the second SPDM-enabled hardware devices that receive the second broadcast message are configured to transmit a broadcast acknowledgment message to the BMC; and
performing a third consensus procedure with each of those second SPDM-enabled hardware devices that responded to the second broadcast message using a second cryptographic hash function of the second block of data, wherein each of the second SPDM-enabled hardware devices perform a fourth consensus procedure with the BMC using the second cryptographic hash function of the block of data.

15. A Baseboard Management Controller (BMC) comprising:
one or more processors and one or more memory units including instructions that, upon execution by the processors, are executed to:
transmit a broadcast message to a plurality of Security Protocol and Data Model (SPDM)-enabled hardware devices of an information handling system (IHS) through a root complex of a PCIe bus using a SPDM-based protocol, wherein the broadcast message comprises a block of data including a digital signature of the BMC, and wherein each of the SPDM-enabled hardware devices that receive the broadcast message are configured to transmit a broadcast acknowledgment message to the BMC; and
perform a first consensus procedure with each of those SPDM-enabled hardware devices that responded to the broadcast message using a cryptographic hash function of the block of data, wherein each of the SPDM-enabled hardware devices perform a second consensus procedure with the BMC using the cryptographic hash function of the block of data.

16. The BMC of claim 15, wherein the SPDM-enabled hardware devices are each inhibited from transmitting the broadcast message.

17. The BMC of claim 15, wherein the instructions are further executed to derive the digital signature of the BMC from a bus device function (BDF) of the BMC.

18. The BMC of claim 15, wherein at least one of the SPDM-enabled hardware devices comprise one or more processors and one or more memory units including hardware device instructions that, upon execution by the processors, are executed to:
transmit a second broadcast message to a plurality of second SPDM-enabled hardware devices, wherein the second broadcast message comprises a second block of data including a digital signature of the one hardware device, and wherein each of the second SPDM-enabled hardware devices that receive the second broadcast message are configured to transmit a broadcast acknowledgment message to the BMC; and
perform a third consensus procedure with each of those second SPDM-enabled hardware devices that responded to the second broadcast message using a second cryptographic hash function of the second block of data, wherein each of the second SPDM-enabled hardware devices perform a fourth consensus procedure with the BMC using the second cryptographic hash function of the block of data.

19. The BMC of claim 15, wherein the instructions are further executed to:
perform a discovery process to discover the SPDM-enabled hardware devices in the IHS; and
transmit the broadcast message to only those SPDM-enabled hardware devices that were discovered during the discovery process.

* * * * *